United States Patent
Yu et al.

(10) Patent No.: US 11,206,137 B2
(45) Date of Patent: *Dec. 21, 2021

(54) PROVIDING HIGH AVAILABILITY COMPUTING SERVICE BY ISSUING A CERTIFICATE

(71) Applicant: Advanced New Technologies Co., Ltd., Grand Cayman (KY)

(72) Inventors: Chaofan Yu, Hangzhou (CN); Lei Wang, Hangzhou (CN); Aihui Zhou, Hangzhou (CN); Ning Zhang, Hangzhou (CN); Hongliang Tian, Hangzhou (CN); Junxian Xiao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,619

(22) Filed: Apr. 5, 2021

(65) Prior Publication Data

US 2021/0226793 A1    Jul. 22, 2021

Related U.S. Application Data

(63) Continuation of application No. 17/035,415, filed on Sep. 28, 2020, now Pat. No. 10,972,272, which is a
(Continued)

(30) Foreign Application Priority Data

Aug. 29, 2019    (CN) .......................... 201910808933.6

(51) Int. Cl.
*G06F 21/51*    (2013.01)
*H04L 9/32*    (2006.01)
(Continued)

(52) U.S. Cl.
CPC .............. *H04L 9/321* (2013.01); *G06F 21/51* (2013.01); *H04L 9/006* (2013.01); *H04L 9/0825* (2013.01);
(Continued)

(58) Field of Classification Search
CPC ..... H04L 9/321; H04L 9/0825; H04L 9/0838; H04L 9/006; H04L 9/3268; H04L 9/007;
(Continued)

(56) References Cited

U.S. PATENT DOCUMENTS 9,331,990 B2    5/2016    Le Saint
9,912,486 B1    3/2018    Sharifi Mehr
(Continued)

FOREIGN PATENT DOCUMENTS

CN    102761556    10/2012
CN    103581167    2/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — David J Pearson
(74) *Attorney, Agent, or Firm* — Fish & Richardson P.C.

(57) ABSTRACT

This disclosure relates to providing a high availability computing service in a distributed system. In one aspect, a method includes sending, by a computing unit of multiple computing units that are each executing a respective copy of a computing task, a certificate request to a trusted certificate generator. The request includes authentication information. The authentication information includes a code hash of the computing task. The computing unit receives a certificate report including a public key certificate in a certificate chain
(Continued)

generated for the code hash and a private key corresponding to the public key certificate. The public key certificate and the private key form a certificate pair. The certificate chain includes multiple certificates including the public key certificate and a root certificate corresponding to the public key certificate. The computing unit is used as a TLS server. The certificate pair is set as a certificate pair of the TLS server.

21 Claims, 10 Drawing Sheets

Related U.S. Application Data continuation of application No. 16/815,596, filed on Mar. 11, 2020, now Pat. No. 10,790,979, which is a continuation of application No. PCT/CN2020/072140, filed on Jan. 15, 2020.

(51) Int. Cl.
*H04L 29/06* (2006.01)
*H04L 9/08* (2006.01)
*H04L 9/00* (2006.01)

(52) U.S. Cl.
CPC .......... *H04L 9/0838* (2013.01); *H04L 9/3268* (2013.01); *H04L 63/166* (2013.01)

(58) Field of Classification Search
CPC ... H04L 9/3265; H04L 9/0823; H04L 63/166; H04L 63/0823; G06F 21/51; G06F 21/44; G06F 21/71
See application file for complete search history.

(56) References Cited

U.S. PATENT DOCUMENTS

| | | |
|---|---|---|
| 10,790,979 B1 | 9/2020 | Yu et al. |
| 10,972,272 B2 | 4/2021 | Yu et al. |
| 2013/0179947 A1 | 7/2013 | Kline, III et al. |
| 2015/0229619 A1 | 8/2015 | Costa et al. |
| 2017/0353319 A1 | 12/2017 | Scarlata et al. |
| 2018/0210742 A1 | 7/2018 | Costa |
| 2018/0241572 A1 | 8/2018 | Miele et al. |
| 2019/0065406 A1 | 2/2019 | Steiner et al. |
| 2019/0132136 A1 | 5/2019 | Scarlata et al. |
| 2019/0140836 A1 | 5/2019 | Novak et al. |
| 2019/0188712 A1 | 6/2019 | Fedorov et al. |
| 2021/0067338 A1 | 3/2021 | Yu et al. |

FOREIGN PATENT DOCUMENTS

| | | |
|---|---|---|
| CN | 106462438 | 2/2017 |
| CN | 107734054 | 2/2018 |
| CN | 108282467 | 7/2018 |
| CN | 108768978 | 11/2018 |
| CN | 108881252 | 11/2018 |
| CN | 108965250 | 12/2018 |
| CN | 110046507 | 7/2019 |
| CN | 110535628 | 12/2019 |
| CN | 110677240 | 1/2020 |
| EP | 3520318 | 8/2019 |
| WO | WO 2017069915 | 4/2017 |
| WO | WO 2018236507 | 12/2018 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Appl. No. PCT/CN2020/072140, dated Jun. 3, 2020, 18 pages (with English translation).

PROVIDING HIGH AVAILABILITY COMPUTING SERVICE BY ISSUING A CERTIFICATE

CROSS-REFERENCE TO RELATED APPLICATIONS

This application is a continuation of and claims the benefit of priority of U.S. patent application Ser. No. 17/035,415, filed Sep. 28, 2020, which is a continuation of and claims the benefit of priority of U.S. patent application Ser. No. 16/815,596, filed Mar. 11, 2020, which is a continuation of PCT Application No. PCT/CN2020/072140, filed on Jan. 15, 2020, which claims priority to Chinese Patent Application No. 201910808933.6, filed on Aug. 29, 2019, and each application is herein incorporated by reference in their entirety.

TECHNICAL FIELD

One or more implementations of the present specification relate to the field of distributed computing and secure computing, and in particular, to providing a high availability computing service in a distributed system.

BACKGROUND

For security of computing and data transmission, a trusted computing unit in a trusted execution environment (TEE) is usually used to perform trusted computing and data processing. The trusted computing unit can ensure that code execution in the trusted computing unit is secure, and external systems including an operating system, a driver, etc. cannot obtain internal secrets such as runtime memory. For example, the trusted computing unit can be used to run an application program and execute a computing task, to ensure execution security of program code and isolation from external systems.

For security of the TEE, before a user terminal exchanges data to be processed with the trusted computing unit, a common encryption key is usually first obtained through negotiation. The key cannot be deciphered by anyone except the two communications parties. Any data transmission between the two parties is encrypted by using the key obtained through negotiation. As such, it can be considered that a trusted channel is established between the user terminal and the trusted computing unit, and secret data can be transmitted securely on the trusted channel.

In many cases, the user terminal needs to communicate with a plurality of trusted computing units in a trusted computing platform. For example, to ensure high availability of a service, a plurality of copies can be provided for the same computing task or computing service, and the plurality of copies are executed by a plurality of computing units. In this case, the user terminal can communicate with any computing unit providing a service copy, to obtain the computing service from the computing unit. When the current computing unit fails, the user terminal can switch to another computing unit running the same computing task. Alternatively, certain trusted computing platforms also support the user terminal in simultaneously communicating with a plurality of computing units. In the previous cases, the user terminal usually needs to separately perform key negotiation with the plurality of trusted computing units to separately establish trusted channels. When a quantity of trusted computing units increases and the quantity is huge, user access or switching becomes complex, cumbersome, and costly.

Therefore, an improved solution is needed to enable a user to obtain a high availability computing service securely and quickly.

SUMMARY

One or more implementations of the present specification describe methods and apparatuses for providing a high availability computing service, where corresponding certificates in a certificate chain are distributed to a trusted computing unit running a computing task and a user terminal requesting the computing task, to ensure that the user terminal can perform secure communication with the corresponding trusted computing unit to obtain a computing service.

According to a first aspect, a method for obtaining a certificate to provide a computing service is provided, where the method is executed by a first computing unit running a first computing task, a plurality of copies of the first computing task are executed by a plurality of computing units, the first computing unit is any of the plurality of computing units, and the method includes: sending a first certificate request to a trusted certificate generator, where the first certificate request includes first authentication information, the first authentication information is used to perform trusted authentication on the first computing unit, and the first authentication information includes a first code hash of the first computing task; receiving a first certificate report from the trusted certificate generator, where the first certificate report includes a first public key certificate in a first certificate chain generated for the first code hash and a first private key matching the first public key certificate, the first public key certificate and the first private key form a first certificate pair, and the first certificate chain further includes a first root certificate corresponding to the first public key certificate; and using the first computing unit as a transport layer security (TLS) server, and setting the first certificate pair as a certificate pair of the TLS server, to provide a computing service of the first computing task for a TLS client having the first root certificate.

In a specific implementation, the first computing unit is implemented as a trusted enclave.

According to an implementation of the first aspect, before sending the first certificate request to the trusted certificate generator, the first computing unit further performs the following steps: generating a unit report file of the first computing unit, where the unit report file includes the first code hash and signature information of the first computing unit; sending the unit report file to a third-party authentication institution to obtain an authentication result file, where the authentication result file includes signature information of the third-party authentication institution; and including the authentication result file in the first certificate request as the first authentication information.

According to another implementation of the first aspect, before sending the first certificate request to the trusted certificate generator, the first computing unit further performs the following steps: generating a unit report file of the first computing unit, where the unit report file includes the first code hash and signature information of the first computing unit; and including the unit report file in the first certificate request as the first authentication information.

According to an implementation of the first aspect, before sending the first certificate request to the trusted certificate generator, the first computing unit performs key negotiation with the trusted certificate generator to establish a trusted channel, where the trusted channel is used to send the first certificate request and receive the first certificate report.

According to a second aspect, a method for distributing a certificate to a computing unit is provided, where the method is executed by a trusted certificate generator, and the method includes: receiving a first certificate request from a first computing unit running a first computing task, where a plurality of copies of the first computing task are executed by a plurality of computing units, the first computing unit is any of the plurality of computing units, the first certificate request includes first authentication information, and the first authentication information includes a first code hash of the first computing task; performing authentication on the first computing unit based on the first authentication information; when the authentication succeeds, obtaining a first certificate chain and a first private key that are generated for the first code hash, where the first certificate chain includes a first root certificate and a corresponding first public key certificate, and the first public key certificate matches the first private key to form a first certificate pair; and sending a first certificate report to the first computing unit, where the first certificate report includes the first certificate pair, so that the first computing unit uses itself as a TLS server and uses the first certificate pair as a certificate pair of the TLS server.

In an implementation of the second aspect, the first authentication information is an authentication result file authenticated by a third-party authentication institution, and the authentication result file includes signature information of the third-party authentication institution; and the performing authentication on the first computing unit based on the first authentication information includes: verifying the signature information, and if the verification succeeds, determining that the authentication on the first computing unit succeeds.

In another implementation of the second aspect, the first authentication information is a unit report file generated by the first computing unit, and the unit report file includes the first code hash and signature information of the first computing unit; and the performing authentication on the first computing unit based on the first authentication information includes: sending the unit report file to a third-party authentication institution to obtain an authentication result file, where the authentication result file includes signature information of the third-party authentication institution; and verifying the signature information, and if the verification succeeds, determining that the authentication on the first computing unit succeeds.

According to an implementation of the second aspect, the obtaining a first certificate chain and a first private key that are generated for the first code hash includes: determining whether there is a generated first certificate chain corresponding to the first code hash; if there is a generated first certificate chain corresponding to the first code hash, reading the generated first certificate chain; or if there is no generated first certificate chain corresponding to the first code hash, generating the first certificate chain for the first code hash.

According to an implementation of the second aspect, the first public key certificate includes a first public key generated for the first code hash and first signature information signed by the trusted certificate generator, the first public key and the first private key form a key pair, the first root certificate includes a second public key generated for the first code hash and second signature information signed by the trusted certificate generator, and the second public key is used to verify the first signature information and the second signature information.

According to another implementation of the second aspect, the first public key certificate includes a first public key generated for the first code hash and first signature information signed by the trusted certificate generator, the first public key and the first private key form a key pair, the first root certificate includes the first public key and second signature information signed by the trusted certificate generator, and the first public key is used to verify the first signature information and the second signature information.

According to an implementation of the second aspect, before receiving the first certificate request from the first computing unit running the first computing task, the certificate generator performs key negotiation with the first computing unit to establish a trusted channel, where the trusted channel is used to receive the first certificate request and send the first certificate report.

According to a third aspect, a method for obtaining a certificate to obtain a computing service is provided, where the method is executed by a user terminal, and the method includes: sending a second certificate request to a trusted certificate generator, where the second certificate request includes a first code hash of a first computing task expected to connect to; receiving a second certificate report from the trusted certificate generator, where the second certificate report includes a first root certificate in a first certificate chain generated for the first code hash, the first certificate chain further includes a first public key certificate corresponding to the first root certificate, the first public key certificate and a matched first private key form a first certificate pair, and the first certificate pair is pre-distributed to at least one authenticated computing unit running the first computing task; and using the user terminal as a TLS client, and setting the first root certificate as a trusted root certificate of the TLS client, to communicate with the at least one computing unit that has the first certificate pair and that functions as a TLS server, for obtaining a computing service of the first computing task from the at least one computing unit.

According to an implementation of the third aspect, before sending the second certificate request to the trusted certificate generator, the user terminal further performs the following steps: obtaining second authentication information of the trusted certificate generator; and performing authentication on the trusted certificate generator based on the second authentication information.

Further, according to an implementation, the second authentication information is an authentication result file authenticated by a third-party authentication institution, and the authentication result file includes signature information of the third-party authentication institution; and the performing authentication on the trusted certificate generator based on the second authentication information includes: verifying the signature information, and if the verification succeeds, determining that the authentication on the trusted certificate generator succeeds.

According to another implementation, the second authentication information is a report file generated by the trusted certificate generator, and the report file includes a code hash and signature information of the trusted certificate generator; and the performing authentication on the trusted certificate generator based on the second authentication information includes: sending the report file to a third-party authentication institution to obtain an authentication result file, where the authentication result file includes signature information of the third-party authentication institution; and verifying the signature information, and if the verification succeeds, determining that the authentication on the certificate generator succeeds.

According to an implementation of the third aspect, after setting the first root certificate as the trusted root certificate of the TLS client, the user terminal performs a TLS handshake with the at least one computing unit to establish a trusted TLS channel; and obtains the computing service of the first computing task from the at least one computing unit through the trusted TLS channel.

In a further implementation, the obtaining the computing service of the first computing task from the at least one computing unit includes: connecting to at least some computing units of the at least one computing unit based on a routing path determined by a routing server based on load balancing of the at least one computing unit, to obtain the computing service of the first computing task from the at least some computing units.

According to a fourth aspect, a method for distributing a certificate to a user terminal is provided, where the method is executed by a trusted certificate generator, and the method includes: receiving a second certificate request sent by the user terminal, where the second certificate request includes a first code hash of a first computing task that the user terminal expects to connect to; obtaining a first certificate chain and a first private key that are pre-generated for the first code hash, where the first certificate chain includes a first root certificate and a first public key certificate corresponding to the first root certificate, the first public key certificate and the first private key form a first certificate pair, and the first certificate pair is pre-distributed to at least one authenticated computing unit running the first computing task; and sending a second certificate report to the user terminal, where the second certificate report includes the first root certificate, so that the user terminal uses itself as a TLS client and uses the first root certificate as a trusted root certificate of the TLS client, to obtain a computing service of the first computing task from a TLS server having the first certificate pair.

According to an implementation of the fourth aspect, before the receiving a second certificate request sent by the user terminal, the method further includes: providing second authentication information for the user terminal in response to an authentication request of the user terminal, for authentication by the user terminal.

In a further implementation, the providing second authentication information for the user terminal includes: generating a report file, where the report file includes a code hash and signature information of the trusted certificate generator; sending the report file to a third-party authentication institution to obtain an authentication result file, where the authentication result file includes signature information of the third-party authentication institution; and providing the authentication result file for the user terminal as the second authentication information.

In another further implementation, the providing second authentication information for the user terminal includes: generating a report file, where the report file includes a code hash and signature information of the trusted certificate generator; and providing the report file for the user terminal as the second authentication information.

According to a fifth aspect, an apparatus for obtaining a certificate to provide a computing service is provided, where the apparatus is deployed in a first computing unit running a first computing task, a plurality of copies of the first computing task are executed by a plurality of computing units, the first computing unit is any of the plurality of computing units, and the apparatus includes: a first certificate request module, configured to send a first certificate request to a trusted certificate generator, where the first certificate request includes first authentication information, the first authentication information is used to perform trusted authentication on the first computing unit, and the first authentication information includes a first code hash of the first computing task; a first report receiving module, configured to receive a first certificate report from the trusted certificate generator, where the first certificate report includes a first public key certificate in a first certificate chain generated for the first code hash and a first private key matching the first public key certificate, the first public key certificate and the first private key form a first certificate pair, and the first certificate chain further includes a first root certificate corresponding to the first public key certificate; and a server setting module, configured to use the first computing unit as a TLS server, and set the first certificate pair as a certificate pair of the TLS server, to provide a computing service of the first computing task for a TLS client having the first root certificate.

According to a sixth aspect, an apparatus for distributing a certificate to a trusted computing unit is provided, where the apparatus is deployed in a trusted certificate generator, and the apparatus includes: a first request receiving module, configured to receive a first certificate request from a first computing unit running a first computing task, where a plurality of copies of the first computing task are executed by a plurality of computing units, the first computing unit is any of the plurality of computing units, the first certificate request includes first authentication information, and the first authentication information includes a first code hash of the first computing task; an authentication module, configured to perform authentication on the first computing unit based on the first authentication information; a certificate chain acquisition module, configured to: when the authentication succeeds, obtain a first certificate chain and a first private key that are generated for the first code hash, where the first certificate chain includes a first root certificate and a corresponding first public key certificate, and the first public key certificate matches the first private key to form a first certificate pair; and a first report sending module, configured to send a first certificate report to the first computing unit, where the first certificate report includes the first certificate pair, so that the first computing unit uses itself as a TLS server and uses the first certificate pair as a certificate pair of the TLS server.

According to a seventh aspect, an apparatus for obtaining a certificate to obtain a computing service is provided, where the apparatus is deployed in a user terminal, and the apparatus includes: a second certificate request module, configured to send a second certificate request to a trusted certificate generator, where the second certificate request includes a first code hash of a first computing task expected to connect to; a second report receiving module, configured to receive a second certificate report from the trusted certificate generator, where the second certificate report includes a first root certificate in a first certificate chain generated for the first code hash, the first certificate chain further includes a first public key certificate corresponding to the first root certificate, the first public key certificate and a matched first private key form a first certificate pair, and the first certificate pair is pre-distributed to at least one authenticated computing unit running the first computing task; and a client setting module, configured to use the user terminal as a TLS client, and set the first root certificate as a trusted root certificate of the TLS client, to communicate with the at least one computing unit that has the first certificate pair and that functions as a TLS server, for obtaining a computing service of the first computing task from the at least one computing unit.

According to an eighth aspect, an apparatus for distributing a certificate to a user terminal is provided, where the apparatus is deployed in a trusted certificate generator, and the method includes: a second request receiving module, configured to receive a second certificate request sent by the user terminal, where the second certificate request includes a first code hash of a first computing task that the user terminal expects to connect to; a certificate chain acquisition module, configured to obtain a first certificate chain and a first private key that are pre-generated for the first code hash, where the first certificate chain includes a first root certificate and a first public key certificate corresponding to the first root certificate, the first public key certificate and the first private key form a first certificate pair, and the first certificate pair is pre-distributed to at least one authenticated computing unit running the first computing task; and a second report sending module, configured to send a second certificate report to the user terminal, where the second certificate report includes the first root certificate, so that the user terminal uses itself as a TLS client and uses the first root certificate as a trusted root certificate of the TLS client, to obtain a computing service of the first computing task from a TLS server having the first certificate pair.

According to a ninth aspect, a computer readable storage medium is provided, where the computer readable storage medium stores a computer program, and when the computer program is executed in a computer, the computer is enabled to perform the methods according to the first aspect to the fourth aspect.

According to a tenth aspect, a computing device is provided, where the computing device includes a memory and a processor, the memory stores executable code, and when executing the executable code, the processor implements the methods according to the first aspect to the fourth aspect.

According to the method and the apparatus provided in the implementations of the present specification, a trusted certificate generator generates and distributes certificates to implement security authentication and verification, so that a user terminal can obtain a computing service from a trusted computing unit. Specifically, the trusted certificate generator distinguishes between different computing tasks based on code hashes, and generates one set of certificate chain and one private key for one code hash, where the certificate chain includes a public key certificate and a corresponding root certificate, and the public key certificate matches the private key to form a certificate pair. Then, the trusted certificate generator distributes the certificate pair to each authenticated trusted computing unit running a computing task corresponding to the code hash. In addition, the trusted certificate generator distributes the root certificate in the certificate chain to a user terminal requesting the computing task. Then, the user terminal having the root certificate and the trusted computing unit having the corresponding certificate pair can perform secure communication by using the TLS protocol.

BRIEF DESCRIPTION OF DRAWINGS

To describe the technical solutions of the implementations of the present application more clearly, the following briefly describes the accompanying drawings needed for describing the implementations. Clearly, the accompanying drawings in the following description show merely some implementations of the present application, and a person of ordinary skill in the art can still derive other drawings from these accompanying drawings without creative efforts.

DESCRIPTION OF IMPLEMENTATIONS

The solutions provided in the present specification are described below with reference to the accompanying drawings.

Figure 1:
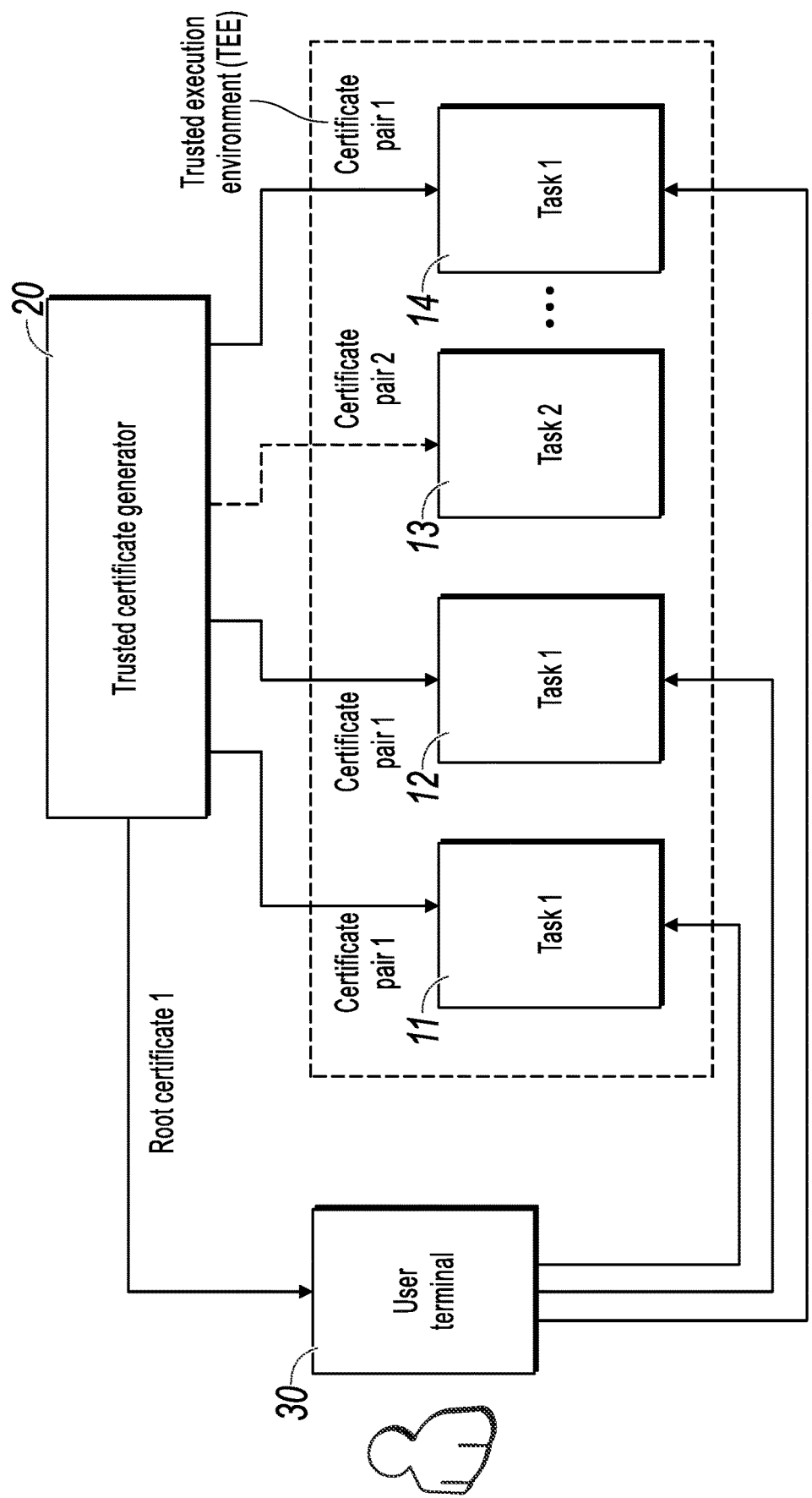
FIG. 1 is a schematic diagram illustrating an implementation scenario of an implementation disclosed in the present specification.

FIG. 1 is a schematic diagram illustrating an implementation scenario of an implementation disclosed in the present specification. As shown in FIG. 1, a needed computing task can be executed by a trusted computing unit in a trusted execution environment (TEE). The trusted computing unit can be a computing module or a computing device having a certain isolation capability to ensure computing security, such as a trusted computing enclave. For example, the trusted computing unit is implemented by using technologies such as SGX or Arm TrustZone™. For example, based on the SGX technology, a series of CPU instruction codes are provided, to allow user code to create a private memory area with high access permission to form a computing enclave. Other application programs including an operating system (OS), a BIOS system, a virtual machine system, etc. cannot access data in the enclave, and therefore cannot pry or tamper with a state and data of an application program in the enclave. Therefore, executing a computing task by a trusted computing unit such as an enclave can ensure isolation of task code from external systems and ensure execution security of a task program.

In addition, to ensure high availability of a computing service, a plurality of code copies can be provided for a computing task, and the plurality of copies can be executed by a plurality of trusted computing units to form a plurality of enclaves. For example, the same computing task can be separately executed by a plurality of enclaves. For example, in FIG. 1, task 1 has three copies, which are respectively executed by trusted computing units 11, 12, and 14. As such, when a certain trusted computing unit fails, a user can connect to another trusted computing unit to obtain a computing service of task 1, thereby ensuring that the service is not interrupted. In addition, a plurality of trusted computing units can share load based on user traffic, to jointly provide a computing service externally.

In the case shown in FIG. 1, when the user wants to obtain the computing service of task 1, the user can use user terminal 30 to communicate with any of the trusted computing units running task 1. However, as described previously, for security of the TEE, the user terminal can perform data transmission and exchange only by establishing a trusted channel with each trusted computing unit. If the user terminal performs key negotiation with each trusted computing unit to establish the trusted channel with each trusted computing unit, it is clearly complex and cumbersome.

To facilitate establishment of a trusted connection between the user terminal and the trusted computing unit providing the computing service, according to an implementation of the present specification, trusted certificate generator 20 is used to generate a digital certificate and manage the digital certificate, so that the user terminal is connected to the trusted computing unit providing the needed computing service through certificate generation and distribution management.

Specifically, trusted certificate generator 20 distinguishes between different computing tasks based on code hashes. For a certain task, which is referred to as, for example, a first computing task, the trusted certificate generator generates a set of certificate chain and a private key for the task, where the certificate chain includes a public key certificate and a corresponding root certificate, and the public key certificate matches the private key to form a certificate pair. Then, the trusted certificate generator distributes the certificate pair to each authenticated trusted computing unit running the first computing task. In this case, a plurality of trusted computing units running copies of the same task obtain the same certificate pair. In addition, the trusted certificate generator distributes the root certificate in the certificate chain to a user terminal requesting the task, for example, the first computing task.

Next, each trusted computing unit running the first computing task can be used as a Transport Layer Security (TLS) server, the certificate pair distributed to the trusted computing unit can be used as a certificate pair of the TLS server, the user terminal requesting the first computing task can be used as a TLS client, and the root certificate distributed to the user terminal can be used as a trusted root certificate of the TLS client. Because the certificate pair and the root certificate form one set of certificate chain, and the TLS client shakes hands only with the TLS server having the corresponding certificate pair in the same certificate chain, it is ensured that the user terminal requesting the first computing task shakes hands only with the trusted computing unit running the first computing task to establish a trusted channel, for obtaining a computing service corresponding to the first computing task from the trusted computing unit.

The following describes a specific implementation of the previous concept.

Figure 2:
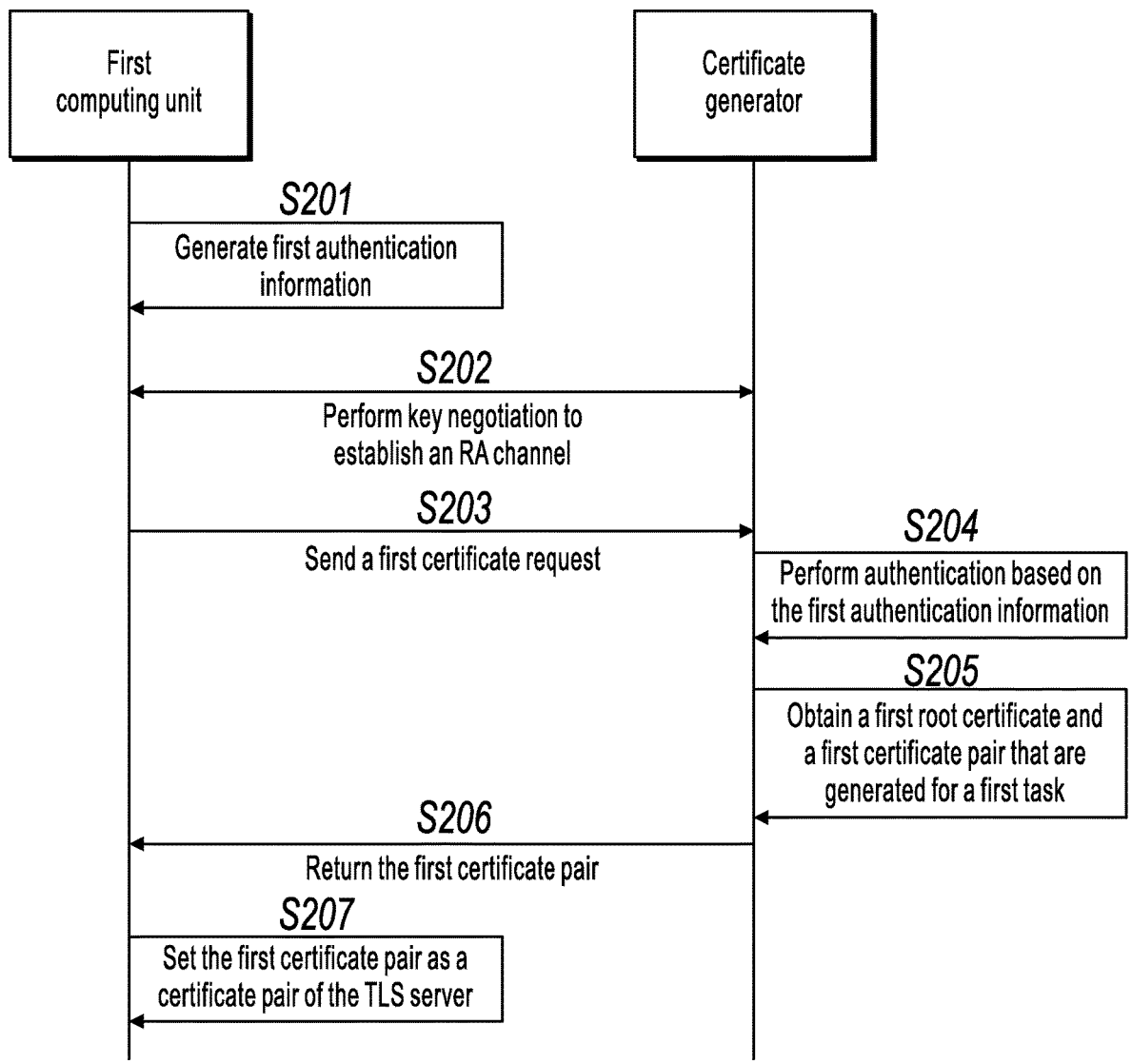
FIG. 2 is a schematic diagram illustrating a process of issuing a certificate to a trusted computing unit, according to an implementation.

FIG. 2 is a schematic diagram illustrating a process of issuing a certificate to a trusted computing unit, according to an implementation. According to the process in FIG. 2, a trusted certificate generator issues a digital certificate to a first computing unit running a first computing task, so that the first computing unit subsequently provides a computing service corresponding to the first computing task. It can be understood that the first computing task can be any computing task, the first computing task has a plurality of code copies, the plurality of copies are executed by a plurality of computing units, and the first computing unit is any of the plurality of computing units. For example, the first computing task can be, for example, task 1 shown in FIG. 1, where task 1 has three copies, which are respectively executed by trusted computing units 11, 12, and 14; and the first computing unit can be any of trusted computing units 11, 12, and 14.

The process of issuing a certificate is described below.

In step S201, when the first computing task is started in the first computing unit, first authentication information is generated, where the first authentication information is used by another party to perform trusted authentication on the first computing unit. The trusted authentication is usually implemented by remote attestation (RA). Therefore, the generated authentication information is also referred to as RA information or an RA report.

In an implementation, the first computing unit generates a unit report file of the computing unit as the first authentication information, where the unit report file is used to describe a configuration status and an operation status of the first computing unit. Specifically, the unit report file includes at least a hash of program code of the running first computing task, where the hash is referred to as a first code hash. It can be understood that the first code hash can uniquely identify the running first computing task. Optionally, the unit report can further include other description information of the running first computing task, such as name, version, and attribute information.

The unit report file further includes signature information of the first computing unit to ensure that the unit report file is authentic and reliable, thereby preventing the unit report file from being forged and tampered with. The signature information can be obtained by using various signing methods, such as a hash algorithm and an encryption algorithm. In a specific implementation, the signature information depends on a hardware key corresponding to the first computing unit, and the hardware key uniquely corresponds to physical hardware, thereby ensuring that the signature information in the unit report file is truly generated by the trusted computing unit based on the hardware.

In an implementation, the unit report file further includes hardware information of the first computing unit, such as a CPU frequency and a memory capacity. In an implementation, the unit report file further includes runtime environment information of the first computing unit, thereby more comprehensively describing the current operation status. In another implementation, the unit report file can further include other user-defined data for describing and defining other information of the trusted computing unit as needed.

As such, the generated unit report file can be used as the first authentication information, used by another party to perform trusted authentication on the first computing unit.

In an implementation, after generating the unit report file, the first computing unit sends the unit report file to a third-party authentication institution for authentication to obtain an authentication result file, and then uses the authentication result file as the first authentication information.

It can be understood that the third-party authentication institution is a trusted authoritative authentication institution having an authentication capability. Usually, assume that each trusted computing unit is registered in the third-party authentication institution before being put into use, the third-party authentication institution registers a configuration status of each trusted computing unit, so that the third-party authentication institution can subsequently perform authentication on the trusted computing unit.

For example, when the first computing unit is a trusted enclave implemented by using Intel™ SGX, the third-party authentication institution is an Intel™ attestation server. When the first computing unit is implemented by using other methods, the third-party authentication institution can be an institution that produces and deploys the corresponding computing unit or an associated institution of the institution.

After receiving the unit report file of the first computing unit, the third-party authentication institution can perform authentication on security and credibility of the first computing unit based on the unit report. Specifically, the third-party authentication institution first authenticates, based on the signature information in the unit report file, whether the unit report file is authentic without tampering, and determines, based on maintained pre-registered information of each trusted computing unit, whether the first computing unit is truly credible. In addition, the third-party authentication institution further verifies, based on related information of the first computing task in the unit report file, whether the first computing task runs in a TEE and whether the first code hash satisfies expectations.

When the verification is performed on the unit report file and the verification succeeds, the third-party institution can add its own signature to the unit report file to generate the authentication result file. In other words, the authentication result file includes the signature information of the third-party authentication institution.

After obtaining the authentication result file returned by the third-party authentication institution, the first computing unit can use the authentication result file as the first authentication information to prove the trusted computing unit.

In addition, in step S202, the first computing unit preforms key negotiation with the trusted certificate generator to establish a trusted channel, which is also referred to as an RA channel.

Specifically, the first computing unit and the trusted certificate generator can use various key negotiation methods to determine a common key or key pair. For example, the first computing unit and the trusted certificate generator can use the Diffie-Hellman (DH) key exchange method or the ECDH key exchange method that is based on an elliptic curve. The trusted channel can be established by using the key or key pair obtained through negotiation, to ensure that data transmitted through the trusted channel can be obtained only by the two parties.

It should be understood that a sequence of step S201 and step S202 may not be limited to the sequence shown in FIG. 2, and step S202 can be executed before step S201 or the two steps can be executed in parallel.

Next, in step S203, the first computing unit sends a certificate acquisition request to the trusted certificate generator through the RA channel, where the certificate acquisition request is referred to as a first certificate request below. The first certificate request includes the first authentication information obtained in step S201, and the first authentication information includes the first code hash of the first computing task.

After receiving the first certificate request, in step S204, the trusted certificate generator first performs authentication on the first computing unit based on the first authentication information.

As described previously, in an implementation, the first authentication information can be the unit report file generated by the first computing unit. In this case, the trusted certificate generator sends the unit report file to the third-party authentication institution for verification by the third-party authentication institution. If the verification succeeds, the authentication result file is returned, where the authentication result file includes the signature information of the third-party authentication institution. Then, the trusted certificate generator further verifies the signature information, and if the verification succeeds, the trusted certificate generator considers that the authentication on the first computing unit succeeds.

In another implementation, the first authentication information can be the authentication result file received by the first computing unit from the third-party authentication institution. In this case, the trusted certificate generator only needs to verify the signature information in the authentication result file. If the verification succeeds, the trusted certificate generator considers that the authentication on the first computing unit succeeds.

If the authentication on the first computing unit succeeds, in step S205, the trusted certificate generator obtains a first certificate chain and a first private key that are generated for the first code hash, where the first certificate chain includes a first root certificate and a corresponding first public key certificate, and the first public key certificate matches the first private key to form a first certificate pair.

The certificate chain and the certificate pair are briefly described below.

The digital certificate is an electronic document issued by the Certificate Authority (CA) and is used to perform authentication on identity validity of a holder to alleviate third-party impersonation. Generally, the digital certificate includes information about a holder, a public key of the holder, information about an issuer, and a signature of the issuer. Because the digital certificate includes the public key generated for the holder, such digital certificate is also referred to as a public key certificate. Correspondingly, the issuing institution further generates a matched private key corresponding to the public key of the holder. The public key and the private key form an asymmetrically encrypted key pair. In this case, the public key certificate and the private key form a certificate pair.

Figure 3:
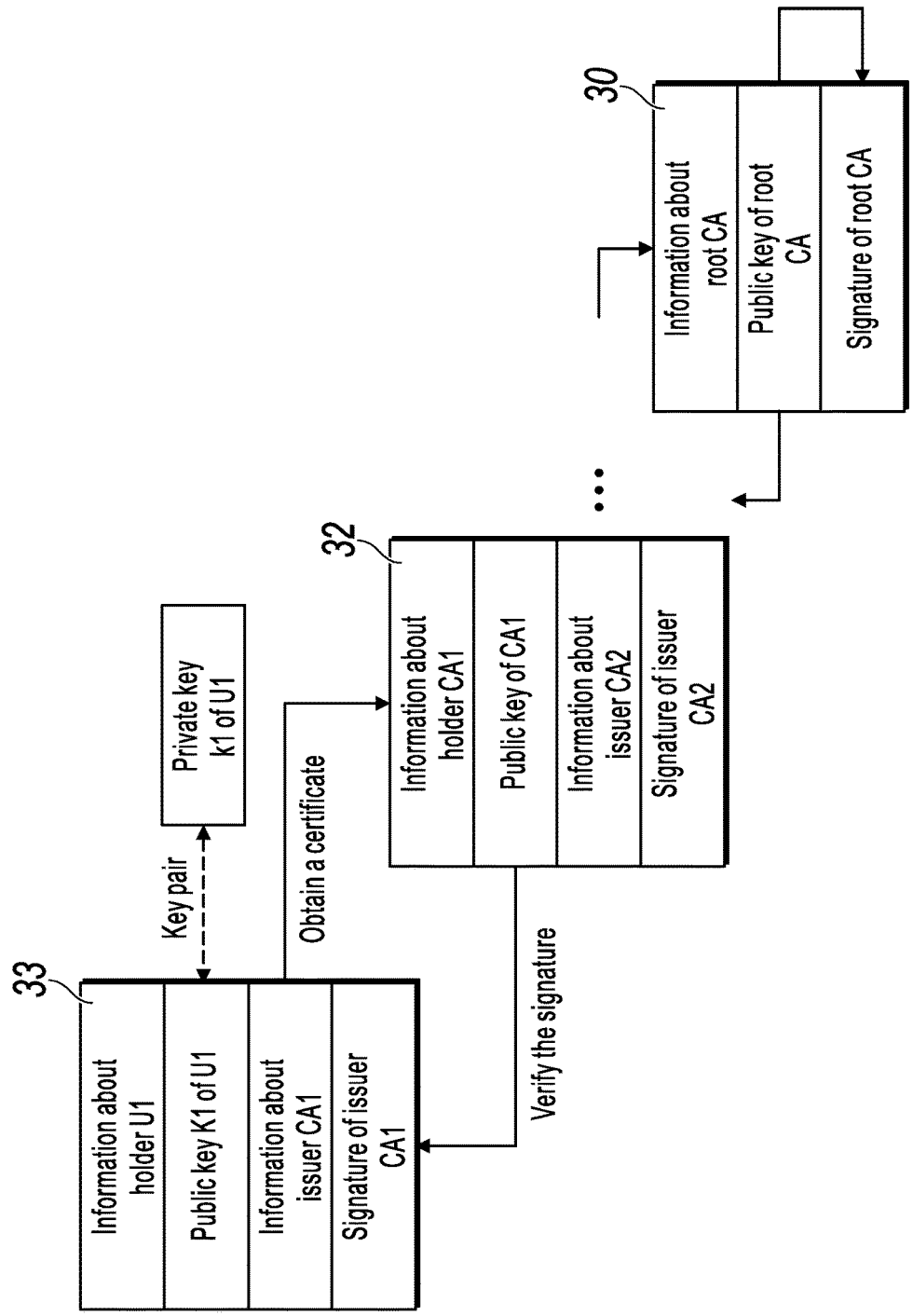
FIG. 3 shows a certificate chain and a certificate pair of digital certificates in an example.

FIG. 3 shows a certificate chain and a certificate pair of digital certificates in an example. Assume that digital certificate 33 is a public key certificate issued by issuing institution CA1 to holder U1, certificate 33 includes information about holder U1, public key K1 of holder U1, information about issuer CA1, and a signature of issuer CA1. Issuer CA1 further generates private key k1 corresponding to public key K1, and then certificate 33 and private key k1 form a certificate pair.

When a verifier wants to verify certificate 33, the verifier can verify certificate 33 by using a public key of issuer CA1. However, if the verifier does not trust issuer CA1 enough, the verifier needs to trace upwards to obtain a certificate of CA1, to verify whether CA1 is legal and credible. In this case, the verifier can trace upwards to certificate 32. The certificate 32 is a certificate issued by issuing institution CA2 to CA1, and includes information about CA1 (in this case, CA1 is a certificate holder), a public key of CA1, information about issuer CA2, and a signature of issuer CA2. The verifier can verify the signature of CA1 in certificate 33 by using the public key of CA1 in certificate 32. However, if the verifier still does not trust issuing institution CA2 enough, the verifier needs to continue to trace upwards until finally trace to root certificate 30.

The root certificate is a certificate issued by root CA to itself, and root CA is usually the most authoritative CA center and must be trusted. As shown in FIG. 3, root certificate 30 includes information about root CA (in this case, root CA is both a holder and an issuer), a public key of root CA, and signature information given by root CA to itself.

As such, root certificate 30 and public key certificates form a certificate chain or trust chain, where the root certificate is issued by root CA to itself, and the subsequent public key certificates are issued by root CA and various levels of CAs authorized by root CA level by level. The root certificate is a start point of the certificate chain, and a quantity of levels of the certificate chain depends on an actual case.

Return to step S205 in FIG. 2, after determining that the authentication on the first computing unit succeeds, the trusted certificate generator obtains the first certificate chain and the corresponding first private key that are generated for the first code hash of the first computing task. Specifically, the trusted certificate generator can first determine whether there is a generated first certificate chain corresponding to the first code hash. If there is a generated first certificate chain corresponding to the first code hash, it means that another computing unit that also runs the first computing task has requested the trusted certificate generator to generate the corresponding certificate chain. In this case, only the generated first certificate chain and the corresponding first private key need to be read. If there is no generated first certificate chain corresponding to the first code hash, it means that no certificate chain is previously generated for the first computing task. In this case, the first certificate chain and the first private key are generated for the first code hash of the first computing task.

As described previously, the first certificate chain includes the first root certificate and the corresponding first public key certificate, and the first public key certificate matches the first private key to form the first certificate pair.

In different implementations, the first public key certificate and the first root certificate can be in a plurality of formats, such as the standard format X.509 certificate of the public key certificate in cryptography.

In addition, it should be understood that the trusted certificate generator generates different certificate chains for different computing tasks, in other words, for different code hashes, a root certificate and a public key certificate in a certificate chain have a mapping relationship, and root certificates in different certificate chains are different from each other.

Correspondingly, for the first certificate chain, the first root certificate is a start point of the trust chain and corresponds to the first public key certificate. In different implementations, the first public key certificate corresponds to the first root certificate in different ways.

Figure 4:
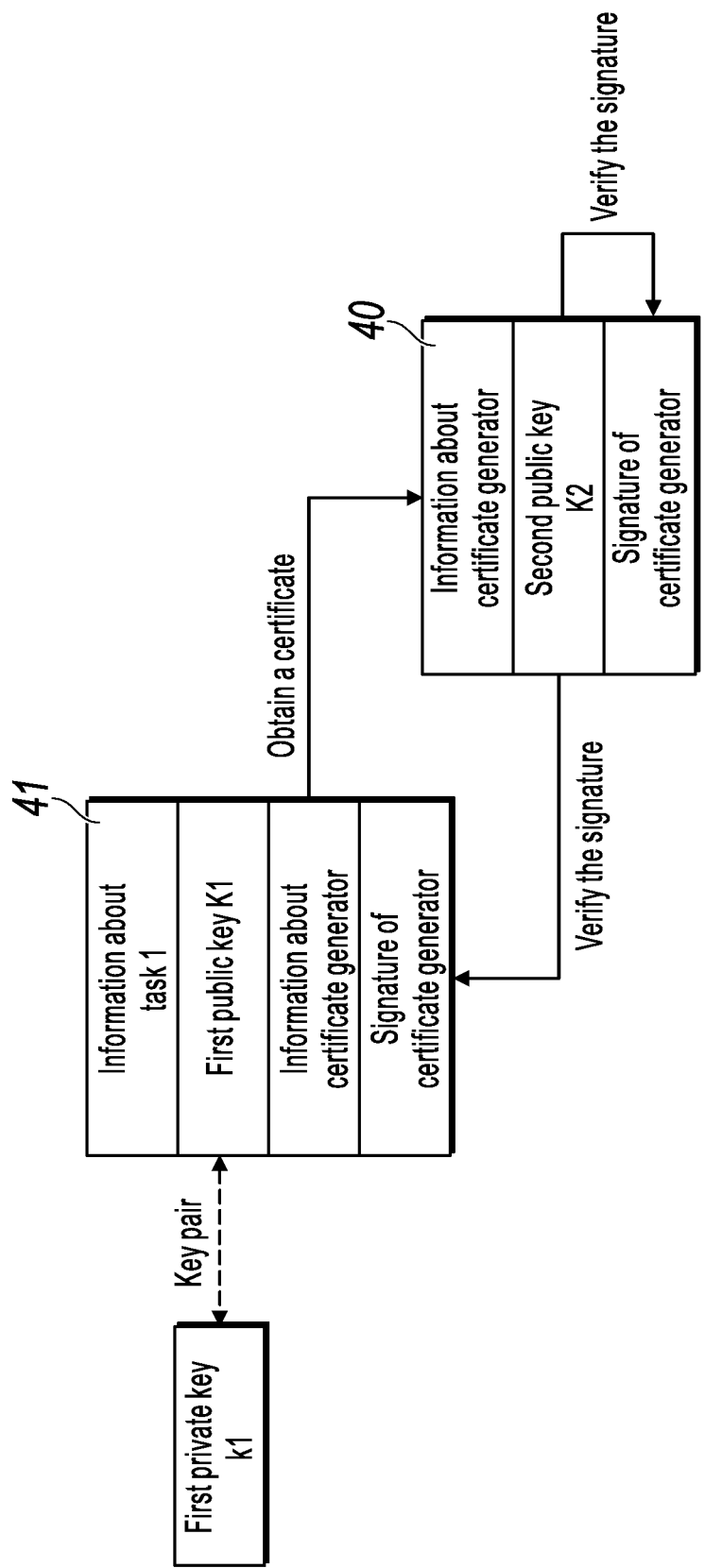
FIG. 4 shows a first certificate chain in an implementation.

FIG. 4 shows a first certificate chain in an implementation. In FIG. 4, certificate 41 is a first public key certificate, and includes information about a first computing task (for example, task 1) used as a certificate holder, first public key K1 (a public key generated for task 1), information about a certificate generator used as an issuer, and first signature information signed by the certificate generator. First private key k1 matches first public key K1. Certificate 40 is a first root certificate, and includes the information about the certificate generator (used as both a certificate holder and a certificate issuer), second public key K2 (an external signature public key of the certificate generator), and second signature information signed by the certificate generator.

Both the first signature information in first public key certificate 41 and the second signature information in first root certificate 40 are verified by using second public key K2. In addition, second public key K2 is generated for a first code hash of the first computing task. As such, both first root certificate 40 and first public key certificate 41 uniquely correspond to the first code hash.

Figure 5:
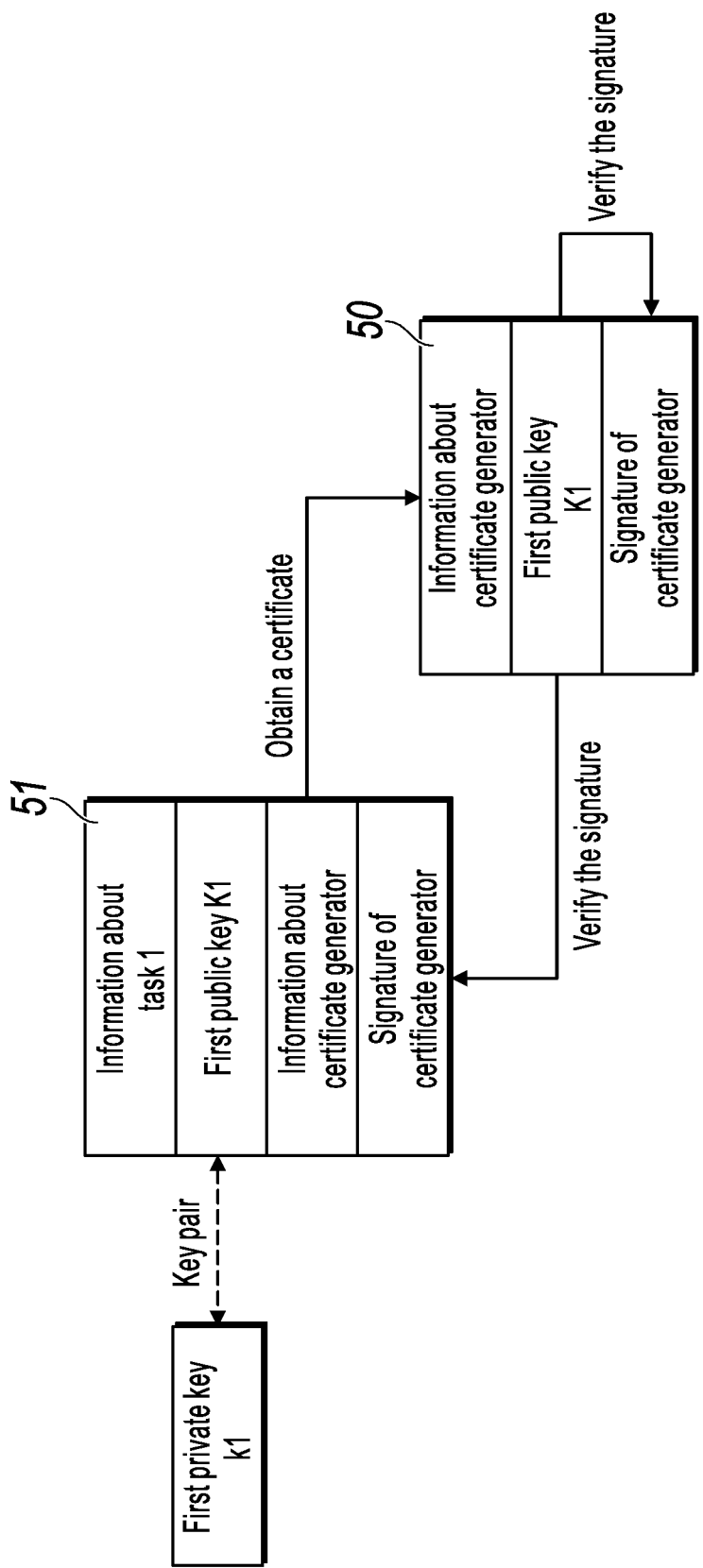
FIG. 5 shows a first certificate chain in another implementation.

FIG. 5 shows a first certificate chain in another implementation. In FIG. 5, certificate 51 is a first public key certificate, and includes information about a first computing task (for example, task 1) used as a certificate holder, first public key K1 (a public key generated for task 1), information about a certificate generator used as an issuer, and first signature information signed by the certificate generator. Certificate 50 is a first root certificate, and includes the information about the certificate generator (used as both a certificate holder and a certificate issuer), first public key K1, and second signature information signed by the certificate generator.

It can be seen that the difference between FIG. 5 and FIG. 4 is that in first root certificate 50 in FIG. 5, first public key K1 generated for task 1 is also used as an external signature public key of the certificate generator. Then, both the first signature information in first public key certificate 51 and the second signature information in first root certificate 50 are verified by using first public key K1. As such, public key generation of the certificate chain is simplified. In addition, because first public key K1 is generated for task 1, both first root certificate 50 and first public key certificate 51 uniquely correspond to a first code hash.

In other examples, the first public key certificate and the first root certificate can correspond to each other at an interval of more levels (for example, certificates 33 and 30 in FIG. 3).

As such, the trusted certificate generator obtains the first root certificate, the first public key certificate, and the first private key that are generated for the first code hash.

Next, in step S206, the trusted certificate generator sends the first certificate pair formed by the first public key certificate and the first private key to the first computing unit through the previously established trusted channel, namely, the RA channel. As such, the content of the first certificate pair cannot be obtained by other computing units.

After the first computing unit obtains the first certificate pair, in step S207, the first computing unit uses the certificate pair to strengthen an online service interface by using the TLS security protocol, to provide a basis for subsequently providing a secure computing service for a user terminal.

Transport Layer Security (TLS) is a security protocol decoupled from the upper application layer, and is used to provide confidentiality and data integrity between two communications application programs. An application layer protocol, such as the HTTP/RPC protocol, can transparently run on the TLS protocol, and the TLS protocol is used to perform negotiation and authentication needed for establishment of an encryption channel. Any data transmitted by using the application layer protocol is encrypted when passing through the TLS protocol, thereby ensuring communication privacy.

Specifically, the TLS security protocol supports a client-server communication mode, where a TLS client and a TLS server use certificates to shake hands to establish an encryption channel, to strengthen an upper-layer network service, such as an HTTP/RPC network service.

Correspondingly, in step S207, the first computing unit can use itself as a TLS server, and set the received first certificate pair as a certificate pair of the TLS server.

Subsequently, the first computing unit can provide a computing service corresponding to the first computing task for a TLS client having the corresponding first root certificate. It will be described in detail subsequently.

As such, according to the process in FIG. 2, the first computing unit running the first computing task obtains the first certificate pair generated for the first computing task from the trusted certificate generator. It can be understood that each other computing unit can execute the process shown in FIG. 2, and obtain the certificate pair corresponding to the running computing task respectively.

Figure 6:
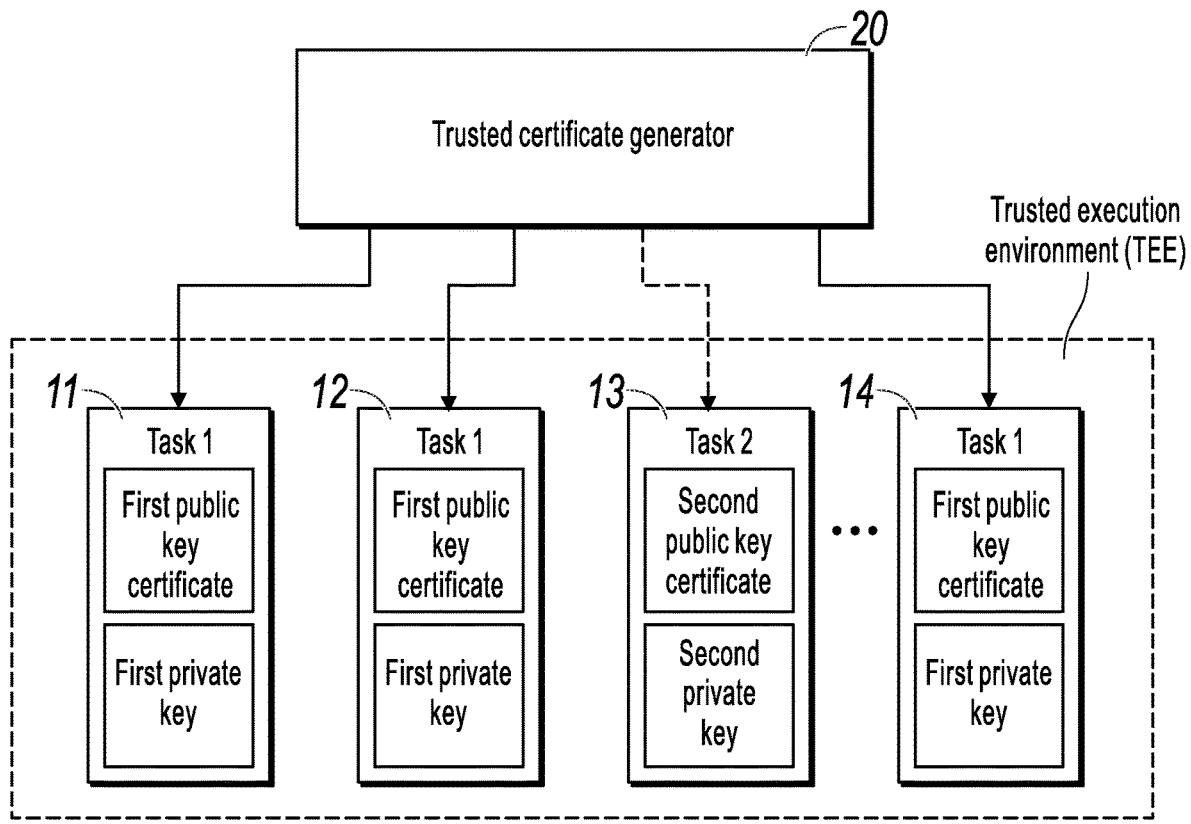
FIG. 6 shows a state of each computing unit after the process shown in FIG. 2 is executed.

FIG. 6 shows a state of each computing unit after the process shown in FIG. 2 is executed. As shown in FIG. 6, trusted computing units 11, 12, and 14 all execute copies of first computing task 1, and the copies have the same code hash. Therefore, trusted computing units 11, 12, and 14 all can obtain a first certificate pair generated for the code hash of task 1, where the first certificate pair includes a first public key certificate and a first private key. Trusted computing unit 13 runs second computing task 2. Therefore, the trusted computing unit 13 can obtain a second certificate pair generated for a code hash of task 2, where the second certificate pair includes a second public key certificate and a second private key. As such, each computing unit can obtain a certificate pair corresponding to a computing task run by the computing unit.

On this basis, the trusted certificate generator further distributes the root certificate corresponding to the trusted computing unit to the user terminal in response to a request of the user terminal, to facilitate communication between the user terminal and the trusted computing unit.

Figure 7:
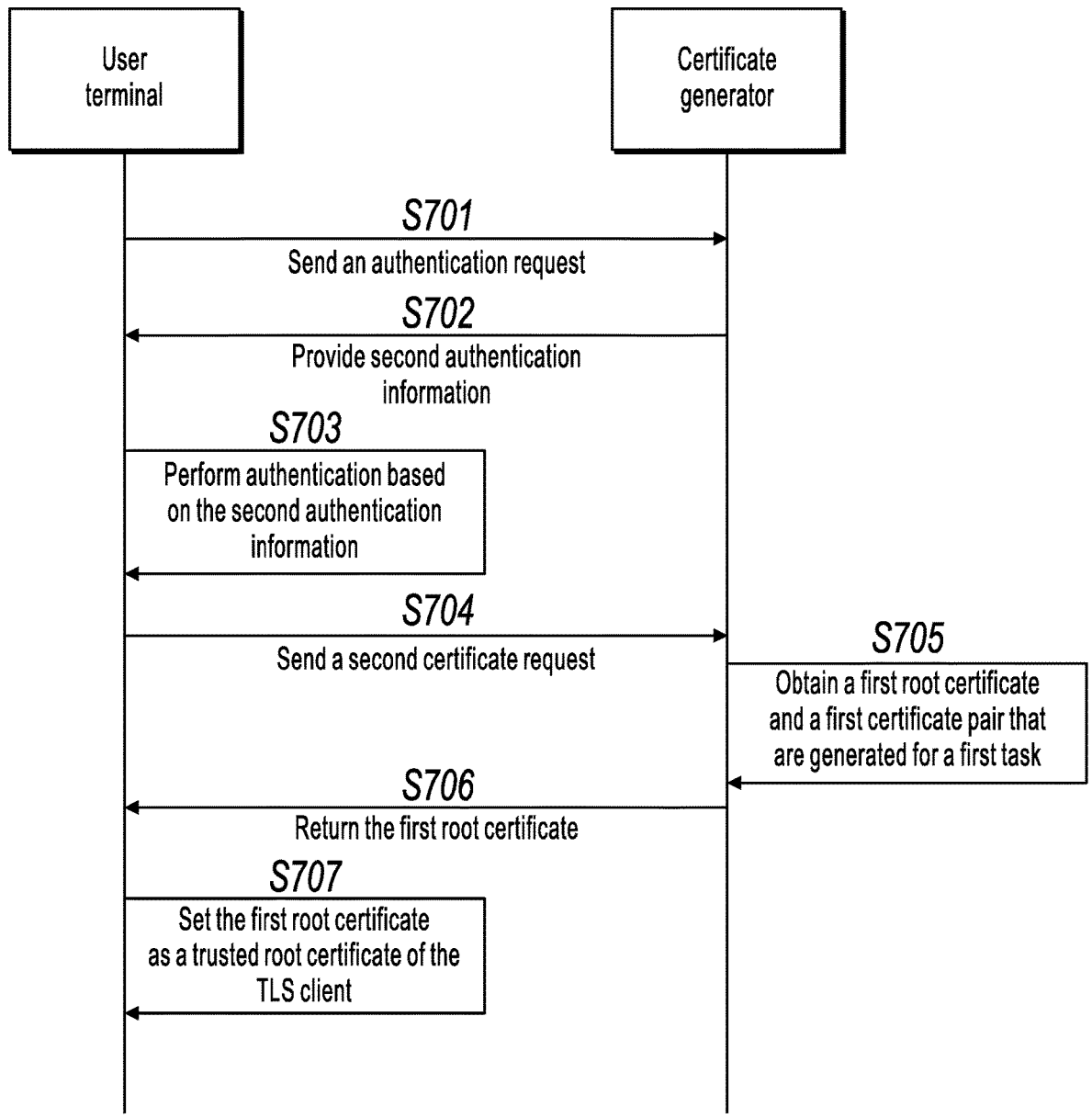
FIG. 7 is a schematic diagram illustrating a process of issuing a certificate to a user terminal, according to an implementation.

FIG. 7 is a schematic diagram illustrating a process of issuing a certificate to a user terminal, according to an implementation.

First, in step S701, the user terminal sends an authentication request to a trusted certificate generator to request to perform RA authentication on the trusted certificate generator.

Then, in step S702, the trusted certificate generator provides RA information of the trusted certificate generator for the user terminal for authentication by the user terminal, where the RA information is referred to as second authentication information.

Correspondingly, in step S703, the user terminal performs authentication on the trusted certificate generator based on the second authentication information.

Similar to authentication on a trusted computing unit, in an implementation, the trusted certificate generator generates its own report file, where the report file includes a code hash and signature information of the trusted certificate generator. Optionally, the report file further includes other configuration description information of the trusted certificate generator. Therefore, in step S702, the trusted certificate generator sends the report file to the user terminal as the second authentication information.

In step S703, the user terminal sends the report file to a third-party authentication institution. Similar to the previous description, the third-party authentication institution performs verification based on the signature information and the code hash in the report file, and after the verification succeeds, the third-party authentication institution adds a signature to the report file as an authentication result file. Therefore, the authentication result file includes signature information of the third-party authentication institution. Then, the user terminal can verify the signature information and perform authentication on the trusted certificate generator based on the verification.

Alternatively, in another implementation, after generating the report file, the trusted certificate generator sends the report file to the third-party authentication institution and obtains the authentication result file from the third-party authentication institution. In step S702, the trusted certificate generator provides the authentication result file for the user terminal as the second authentication information. Correspondingly, in step S703, the user terminal only needs to verify the signature information in the authentication result file, to implement the authentication on the trusted certificate generator based on the verification.

After the authentication on the trusted certificate generator succeeds, in step S704, the user terminal sends a certificate request to the trusted certificate generator, where the certificate request is referred to as a second certificate request, and the second certificate request includes a first code hash of a first computing task that the user terminal expects to connect to. For example, in the schematic diagram FIG. 1, if the user terminal wants to connect to task 1, the user terminal includes the code hash of task 1 in the certificate request.

After receiving the second certificate request, in step S705, the trusted certificate generator obtains a first certificate chain and a first private key that are pre-generated for the first code hash, where the first certificate chain includes a first root certificate and a first public key certificate corresponding to the first root certificate, and the first public key certificate and the first private key form a first certificate pair. In addition, as shown in FIG. 2, the trusted certificate generator has pre-distributed the first certificate pair to at least one authenticated computing unit running the first computing task.

Then, in step S706, the trusted certificate generator returns a certificate report to the user terminal, where the certificate report includes the first root certificate in the first certificate chain.

After receiving the first root certificate, in step S707, the user terminal uses itself as a TLS client, and sets the received first root certificate as a trusted root certificate of the TLS client.

In addition, as shown in step S207 in FIG. 2, the computing unit running the first computing task obtains the first certificate pair after the authentication on the computing unit running the first computing task succeeds, and uses the first certificate pair as a certificate pair of the TLS server. Therefore, when the user terminal requesting the first computing task sets the first root certificate as the unique trusted root certificate of the TLS client, the TLS client can only perform secure communication with a trusted computing unit that has the corresponding first certificate pair and that functions as a TLS server, namely, each trusted computing unit running the first computing task.

Specifically, the user terminal used as the TLS client can first perform a TLS handshake with the trusted computing unit used as the TLS server by using the certificates, to establish a trusted TLS channel; and then obtain a computing service corresponding to the first computing task from the trusted computing unit through the trusted TLS channel.

The TLS client having the first root certificate and the TLS server having the first certificate pair can shake hands by using the following process.

First, the TLS client initiates a handshake request, and the TLS server returns the first public key certificate and generated random number N1 to the TLS client.

Because the TLS client has set the first root certificate as the unique trusted root certificate, and the first public key certificate is a certificate in the trust chain of the first root certificate, the TLS client considers that the first public key certificate is credible. Then, the TLS client generates another random number N2, encrypts random number N2 by using a first public key in the first public key certificate, and sends encrypted random number N2 to the TLS server.

The TLS server decrypts random number N2 by using the first private key in the first certificate pair, and generates, based on previous random number N1, N2, and an agreed encryption algorithm, a session key used to encrypt subsequent transmission data. After the TLS client acknowledges the session key, the two parties successfully shake hands and establish the trusted TLS channel by using the session key.

After the handshake succeeds, the user terminal used as the TLS client and the trusted computing unit used as the TLS server can encrypt and decrypt data by using the session key, in other words, exchange data through the trusted TLS channel. Then, the user terminal can obtain the computing service corresponding to the first computing task from the trusted computing unit.

It can be seen that in the process in FIG. 7, the user terminal only performs RA authentication on the trusted certificate generator, but does not perform RA authentication on each computing unit. However, it should be understood that, based on the process in FIG. 2, before issuing a certificate, the trusted certificate generator first performs RA authentication on the computing unit, and then distributes the certificate to the computing unit only when the authentication succeeds. Therefore, that the user terminal preforms RA authentication on the trusted certificate generator means that the user terminal indirectly preforms RA authentication on the trusted computing unit. In addition, with reference to both the process in FIG. 2 and the process in FIG. 7, respective distribution of the certificates in the certificate chain is equivalent to implementation of both RA authentication and TLS verification, thereby simplifying a security authentication process.

Figure 8:
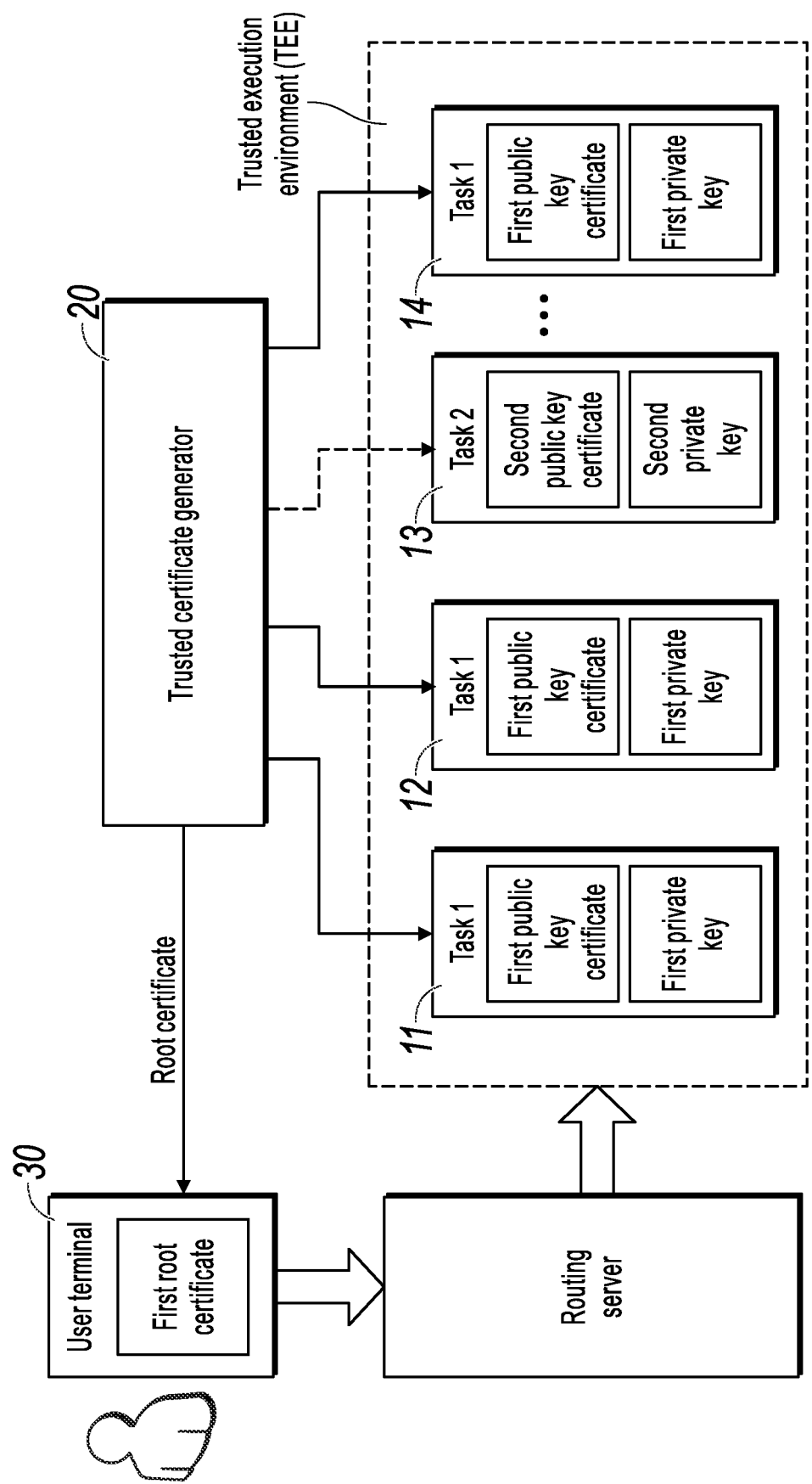
FIG. 8 shows a state of a system after the process shown in FIG. 2 and the process shown in FIG. 7 are executed.

FIG. 8 shows a state of a system after the process shown in FIG. 2 and the process shown in FIG. 7 are executed. As shown in FIG. 8, each computing unit obtains a certificate pair corresponding to a computing task run by the computing unit. For example, trusted computing units 11, 12, and 14 executing first computing task 1 all obtain a first certificate pair generated for a code hash of task 1. In addition, a user terminal requesting a computing service of task 1 can also obtain a first root certificate from a trusted certificate generator, and the first root certificate corresponds to a first public key certificate in trusted computing units 11, 12, and 14 to form a certificate chain.

In addition, trusted computing units 11, 12 and 14 running task 1 each can function as a TLS server, where the first certificate pair is set as a certificate pair of the TLS server; and the user terminal requesting task 1 can function as a TLS client, where the first root certificate is set as a unique trusted root certificate of the TLS client. Then, the user terminal requesting task 1 can perform secure communication with trusted computing units 11, 12, and 14 running task 1 by using the TLS protocol, to obtain a computing service corresponding to task 1.

In addition, as shown in FIG. 8, in an implementation, a routing server is added in front of the trusted computing units, and the routing server can determine a subsequent routing path based on load of the trusted computing units, thereby balancing traffic of the trusted computing units. In this case, the user terminal can connect to a trusted computing unit via the routing server. Specifically, the user terminal connects to the corresponding computing unit based on a routing path determined by the routing server based on load balancing of the computing units. The routing server used for load balancing can be implemented by using various routing algorithms, and implementations are not limited here.

Looking back on the previous processes, a trusted certificate generator generates and distributes certificates to implement security authentication and verification, so that a user terminal can obtain a computing service from a trusted computing unit. Specifically, the trusted certificate generator distinguishes between different computing tasks based on code hashes, and generates one set of certificate chain and one private key for one code hash, where the certificate chain includes a public key certificate and a corresponding root certificate, and the public key certificate matches the private key to form a certificate pair. Then, the trusted certificate generator distributes the certificate pair to each authenticated trusted computing unit running a computing task corresponding to the code hash. In this case, a plurality of trusted computing units running copies of the same computing task obtain the same certificate pair. In addition, the trusted certificate generator distributes the root certificate in the certificate chain to a user terminal requesting the computing task. Then, the user terminal having the root certificate and the trusted computing unit having the corresponding certificate pair can perform secure communication by using the TLS protocol.

Figure 9:
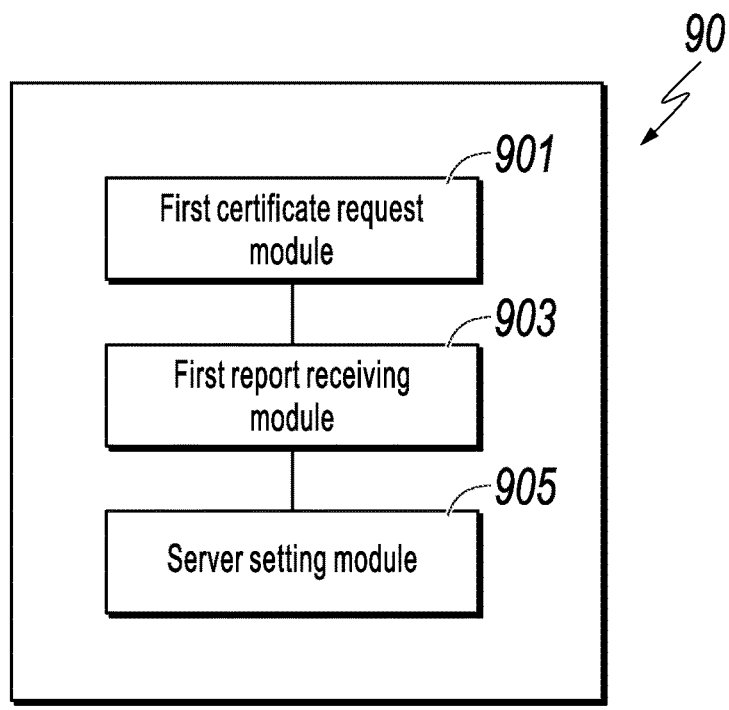
FIG. 9 is a schematic block diagram illustrating an apparatus for providing a computing service in an implementation.

According to another implementation, an apparatus for obtaining a certificate to provide a computing service is provided, where the apparatus is deployed in a first computing unit running a first computing task. A plurality of copies of the first computing task are executed by a plurality of computing units, and the first computing unit is any of the plurality of computing units. FIG. 9 is a schematic block diagram illustrating an apparatus for providing a computing service in an implementation. As shown in FIG. 9, apparatus 90 includes: first certificate request module 901, configured to send a first certificate request to a trusted certificate generator, where the first certificate request includes first authentication information, the first authentication information is used to perform trusted authentication on the first computing unit, and the first authentication information includes a first code hash of the first computing task; first report receiving module 903, configured to receive a first certificate report from the trusted certificate generator, where the first certificate report includes a first public key certificate in a first certificate chain generated for the first code hash, and a first private key matching the first public key certificate, the first public key certificate and the first private key form a first certificate pair, and the first certificate chain further includes a first root certificate corresponding to the first public key certificate; and server setting module 905, configured to use the first computing unit as a TLS server, and set the first certificate pair as a certificate pair of the TLS server, to provide a computing service corresponding to the first computing task for a TLS client having the first root certificate.

In a specific implementation, the first computing unit is implemented as a trusted enclave.

According to an implementation, apparatus 90 further includes an authentication information generation module (not shown), configured to generate the first authentication information.

In a specific implementation, the authentication information generation module is configured to: generate a unit report file of the first computing unit, where the unit report file includes the first code hash and signature information of the first computing unit; send the unit report file to a third-party authentication institution to obtain an authentication result file, where the authentication result file includes signature information of the third-party authentication institution; and include the authentication result file in the first certificate request as the first authentication information.

In another specific implementation, the authentication information generation module is configured to: generate a unit report file of the first computing unit, where the unit report file includes the first code hash and signature information of the first computing unit; and include the unit report file in the first certificate request as the first authentication information.

According to an implementation, apparatus 90 further includes a key negotiation module, configured to: before the first certificate request is sent to the trusted certificate generator, perform key negotiation with the trusted certificate generator to establish a trusted channel, where the trusted channel is used to send the first certificate request and receive the first certificate report.

Figure 10:
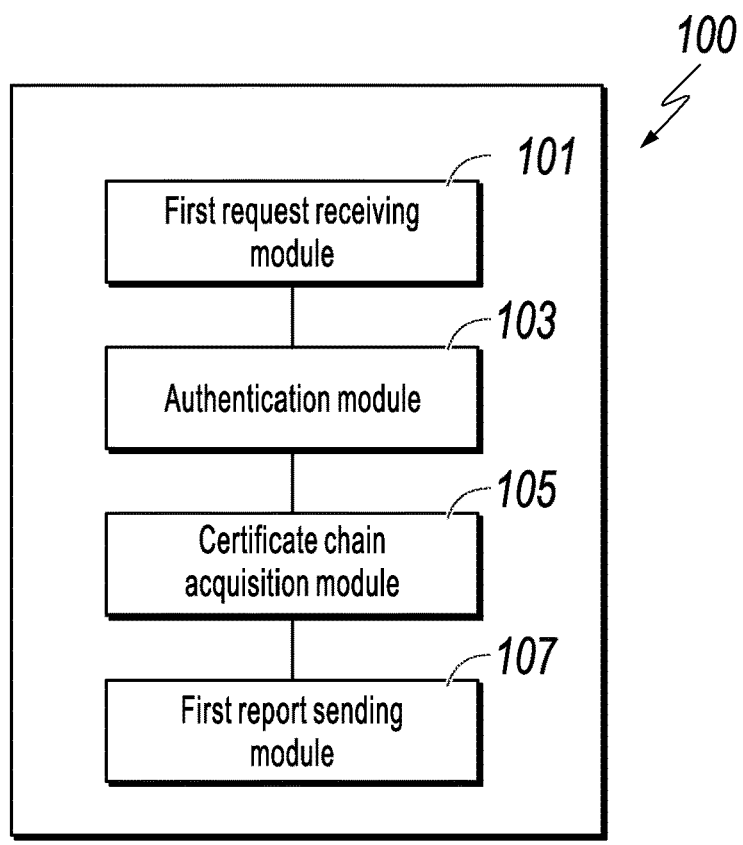
FIG. 10 is a schematic block diagram illustrating an apparatus for issuing a certificate to a trusted computing unit in an implementation.

According to another implementation, an apparatus for distributing a certificate to a trusted computing unit is provided, where the apparatus is deployed in a trusted certificate generator. The trusted certificate generator can be implemented by using any device, platform, or device cluster having computing and processing capabilities. FIG. 10 is a schematic block diagram illustrating an apparatus for issuing a certificate to a trusted computing unit in an implementation. As shown in FIG. 10, apparatus 100 includes: first request receiving module 101, configured to receive a first certificate request from a first computing unit running a first computing task, where a plurality of copies of the first computing task are executed by a plurality of computing units, the first computing unit is any of the plurality of computing units, the first certificate request includes first authentication information, and the first authentication information includes a first code hash of the first computing task; authentication module 103, configured to perform authentication on the first computing unit based on the first authentication information; certificate chain acquisition module 105, configured to: when the authentication succeeds, obtain a first certificate chain and a first private key that are generated for the first code hash, where the first certificate chain includes a first root certificate and a corresponding first public key certificate, and the first public key certificate matches the first private key to form a first certificate pair; and first report sending module 107, configured to send a first certificate report to the first computing unit, where the first certificate report includes the first certificate pair, so that the first computing unit uses itself as a TLS server and uses the first certificate pair as a certificate pair of the TLS server.

In an implementation, the first authentication information received by first request receiving module 101 is an authentication result file authenticated by a third-party authentication institution, and the authentication result file includes signature information of the third-party authentication institution. In this case, authentication module 103 is configured to: verify the signature information, and if the verification succeeds, determine that the authentication on the first computing unit succeeds.

In another implementation, the first authentication information received by first request receiving module 101 is a unit report file generated by the first computing unit, and the unit report file includes the first code hash and signature information of the first computing unit. In this case, authentication module 103 is configured to: send the unit report file to a third-party authentication institution to obtain an authentication result file, where the authentication result file includes signature information of the third-party authentication institution; and verify the signature information, and if the verification succeeds, determine that the authentication on the first computing unit succeeds.

According to an implementation, certificate chain acquisition module 105 is configured to: determine whether there is a generated first certificate chain corresponding to the first code hash; and if there is a generated first certificate chain corresponding to the first code hash, read the generated first certificate chain; or if there is no generated first certificate chain corresponding to the first code hash, generate the first certificate chain for the first code hash.

According to a specific implementation, the first public key certificate includes a first public key generated for the first code hash and first signature information signed by the trusted certificate generator, the first public key and the first private key form a key pair, the first root certificate includes a second public key generated for the first code hash and second signature information signed by the trusted certificate generator, and the second public key is used to verify the first signature information and the second signature information.

According to another specific implementation, the first public key certificate includes a first public key generated for the first code hash and first signature information signed by the trusted certificate generator, the first public key and the first private key form a key pair, the first root certificate includes the first public key and second signature information signed by the trusted certificate generator, and the first public key is used to verify the first signature information and the second signature information.

According to an implementation, apparatus 100 further includes a key negotiation module (not shown), configured to: before the first certificate request is received, perform key negotiation with the first computing unit to establish a trusted channel, where the trusted channel is used to receive the first certificate request and send the first certificate report.

Figure 11:
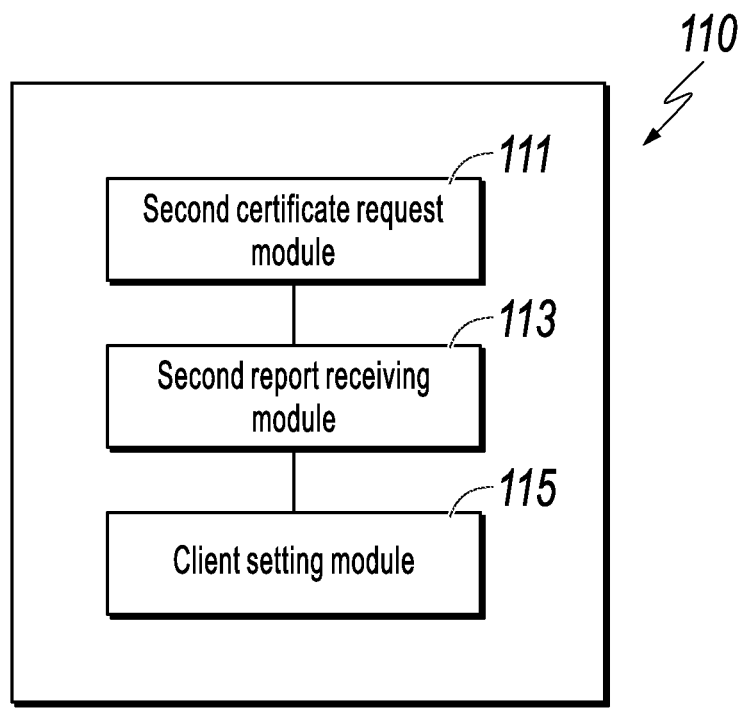
FIG. 11 is a schematic block diagram illustrating an apparatus for obtaining a computing service in an implementation.

According to another implementation, an apparatus for obtaining a certificate to obtain a computing service is provided, where the apparatus is deployed in a user terminal. The user terminal can be implemented by using any device having computing and processing capabilities. FIG. 11 is a schematic block diagram illustrating an apparatus for obtaining a computing service in an implementation. As shown in FIG. 11, apparatus 110 includes: second certificate request module 111, configured to send a second certificate request to a trusted certificate generator, where the second certificate request includes a first code hash of a first computing task expected to connect to; second report receiving module 113, configured to receive a second certificate report from the trusted certificate generator, where the second certificate report includes a first root certificate in a first certificate chain generated for the first code hash, the first certificate chain further includes a first public key certificate corresponding to the first root certificate, the first public key certificate and a matched first private key form a first certificate pair, and the first certificate pair is pre-distributed to at least one authenticated computing unit running the first computing task; and client setting module 115, configured to use the user terminal as a TLS client, and set the first root certificate as a trusted root certificate of the TLS client, to communicate with the at least one computing unit that has the first certificate pair and that functions as a TLS server, for obtaining a computing service corresponding to the first computing task from the at least one computing unit.

According to an implementation, apparatus 110 further includes an authentication module (not shown), configured to: obtain second authentication information of the trusted certificate generator; and perform authentication on the trusted certificate generator based on the second authentication information.

Further, according to an implementation, the second authentication information is an authentication result file authenticated by a third-party authentication institution, and the authentication result file includes signature information of the third-party authentication institution; and correspondingly, the authentication module is configured to verify the signature information, and if the verification succeeds, determine that the authentication on the trusted certificate generator succeeds.

According to another implementation, the second authentication information is a report file generated by the trusted certificate generator, and the report file includes a code hash and signature information of the trusted certificate generator; and correspondingly, the authentication module is configured to: send the report file to a third-party authentication institution to obtain an authentication result file, where the authentication result file includes signature information of the third-party authentication institution; and verify the signature information, and if the verification succeeds, determine that the authentication on the certificate generator succeeds.

According to an implementation, apparatus 110 further includes a communications module (not shown). After client setting module 115 sets the first root certificate as the trusted root certificate of the TLS client, the communications module is configured to perform a TLS handshake with the at least one computing unit to establish a trusted TLS channel, and obtain the computing service corresponding to the first computing task from the at least one computing unit through the trusted TLS channel.

In a further implementation, the communication module is configured to connect to at least some computing units of the at least one computing unit based on a routing path determined by a routing server based on load balancing of the at least one computing unit, to obtain the computing service corresponding to the first computing task from the at least some computing units.

Figure 12:
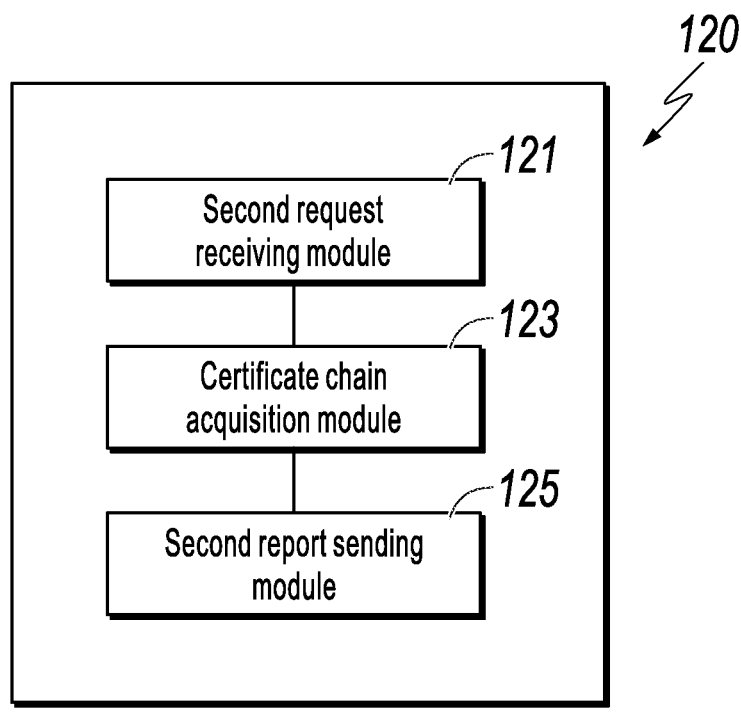
FIG. 12 is a schematic block diagram illustrating an apparatus for issuing a certificate to a user terminal in an implementation.

According to another implementation, an apparatus for distributing a certificate to a user terminal is further provided, where the apparatus is deployed in a trusted certificate generator. The trusted certificate generator can be implemented by using any device, platform, or device cluster having computing and processing capabilities. FIG. 12 is a schematic block diagram illustrating an apparatus for issuing a certificate to a user terminal in an implementation. As shown in FIG. 12, apparatus 120 includes: second request receiving module 121, configured to receive a second certificate request sent by the user terminal, where the second certificate request includes a first code hash of a first computing task that the user terminal expects to connect to; certificate chain acquisition module 123, configured to obtain a first certificate chain and a first private key that are pre-generated for the first code hash, where the first certificate chain includes a first root certificate and a first public key certificate corresponding to the first root certificate, the first public key certificate and the first private key form a first certificate pair, and the first certificate pair is pre-distributed to at least one authenticated computing unit running the first computing task; and second report sending module 125, configured to send a second certificate report to the user terminal, where the second certificate report includes the first root certificate, so that the user terminal uses itself as a TLS client and uses the first root certificate as a trusted root certificate of the TLS client, to obtain a computing service of the first computing task from a TLS server having the first certificate pair.

According to an implementation, apparatus 120 further includes an authentication information providing module (not shown). Before second request receiving module 121 receives the second certificate request sent by the user terminal, the authentication information providing module provides second authentication information for the user terminal in response to an authentication request of the user terminal, for authentication by the user terminal.

In a further implementation, the authentication information providing module is configured to: generate a report file, where the report file includes a code hash and signature information of the trusted certificate generator; send the report file to a third-party authentication institution to obtain an authentication result file, where the authentication result file includes signature information of the third-party authentication institution; and provide the authentication result file for the user terminal as the second authentication information.

In another further implementation, the authentication information providing module is configured to: generate a report file, where the report file includes a code hash and signature information of the trusted certificate generator; and provide the report file for the user terminal as the second authentication information.

According to another implementation, a computer readable storage medium is further provided, where the computer readable storage medium stores a computer program, and when the computer program is executed in a computer, the computer is enabled to perform the methods described with reference to FIG. 2 and FIG. 7.

According to another implementation, a computing device is further provided, where the computing device includes a memory and a processor, the memory stores executable code, and when executing the executable code, the processor implements the methods described with reference to FIG. 2 and FIG. 7.

A person skilled in the art understands that, in the previous one or more examples, the functions described in the present specification can be implemented by hardware, software, firmware, or any combination thereof. When software is used for implementation, these functions can be stored in a computer readable medium or transmitted as one or more instructions or code in the computer readable medium.

The previously described specific implementations further describe the objects, technical solutions, and beneficial effects of the present specification in detail. It should be understood that the application descriptions are merely specific implementations of the present application and are not intended to limit the protection scope of the present application. Any modification, equivalent replacement, improvement, etc. made on the basis of the technical solutions of the present application shall fall within the protection scope of the present application.

What is claimed is:

1. A computer-implemented method, comprising:
sending, by a user terminal, a certificate request to a trusted certificate generator, wherein the certificate request comprises a first code hash of a computing task;
receiving, by the user terminal, a certificate report from the trusted certificate generator, wherein the certificate report comprises a first root certificate in a certificate chain generated for the first code hash, wherein the certificate chain comprises a first public key certificate corresponding to the first root certificate, wherein the first public key certificate and a matched first private key form a first certificate pair, and wherein the first certificate pair is pre-distributed to one or more authenticated computing units running the computing task;

using the user terminal as a transport layer security (TLS) client;

setting the first root certificate as a trusted root certificate of the TLS client to communicate with the one or more authenticated computing units that have the first certificate pair and that functions as a TLS server; and obtaining a computing service corresponding to the computing task from the one or more authenticated computing units.

2. The computer-implemented method of claim 1, further comprising, before sending the certificate request to the trusted certificate generator:

obtaining authentication information of the trusted certificate generator; and performing authentication on the trusted certificate generator based on the authentication information.

3. The computer-implemented method of claim 2, wherein:

the authentication information is an authentication result file authenticated by a third-party authentication institution, and the authentication result file comprises signature information of the third-party authentication institution; and performing authentication on the trusted certificate generator based on the authentication information comprises verifying the signature information, and in response to the signature information being verified successfully, determining that the authentication on the trusted certificate generator succeeds.

4. The computer-implemented method of claim 2, wherein:

the authentication information is a report file generated by the trusted certificate generator, and the report file comprises a second code hash and signature information of the trusted certificate generator; and performing authentication on the trusted certificate generator based on the authentication information comprises, sending the report file to a third-party authentication institution to obtain an authentication result file, wherein the authentication result file comprises additional signature information of the third-party authentication institution, and verifying the additional signature information, and in response to the additional signature information being verified successfully, determining that the authentication on the trusted certificate generator succeeds.

5. The computer-implemented method of claim 1, further comprising, after setting the first root certificate as a trusted root certificate of the TLS client:

performing a TLS handshake with the one or more authenticated computing units to establish a trusted TLS channel; and obtaining the computing service corresponding to the computing task from the one or more authenticated computing units through the trusted TLS channel.

6. The computer-implemented method of claim 5, wherein obtaining the computing service corresponding to the computing task from the one or more authenticated computing units comprises connecting to at least one computing unit of the one or more authenticated computing units based on a routing path determined by a routing server based on load balancing of the one or more authenticated computing units, thereby obtaining the computing service corresponding to the computing task from the at least one computing unit.

7. The computer-implemented method of claim 1, further comprising:

determining that a first authenticated computing unit of the one or more authenticated computing units has failed; and switching to a second authenticated computing unit of the one or more authenticated computing units.

8. A non-transitory, computer-readable medium storing one or more instructions executable by a computer system to perform operations comprising:

sending, by a user terminal, a certificate request to a trusted certificate generator, wherein the certificate request comprises a first code hash of a computing task;

receiving, by the user terminal, a certificate report from the trusted certificate generator, wherein the certificate report comprises a first root certificate in a certificate chain generated for the first code hash, wherein the certificate chain comprises a first public key certificate corresponding to the first root certificate, wherein the first public key certificate and a matched first private key form a first certificate pair, and wherein the first certificate pair is pre-distributed to one or more authenticated computing units running the computing task;

using the user terminal as a transport layer security (TLS) client;

setting the first root certificate as a trusted root certificate of the TLS client to communicate with the one or more authenticated computing units that have the first certificate pair and that functions as a TLS server; and obtaining a computing service corresponding to the computing task from the one or more authenticated computing units.

9. The non-transitory, computer-readable medium of claim 8, wherein the operations comprise, before sending the certificate request to the trusted certificate generator:

obtaining authentication information of the trusted certificate generator; and performing authentication on the trusted certificate generator based on the authentication information.

10. The non-transitory, computer-readable medium of claim 9, wherein:

the authentication information is an authentication result file authenticated by a third-party authentication institution, and the authentication result file comprises signature information of the third-party authentication institution; and performing authentication on the trusted certificate generator based on the authentication information comprises verifying the signature information, and in response to the signature information being verified successfully, determining that the authentication on the trusted certificate generator succeeds.

11. The non-transitory, computer-readable medium of claim 9, wherein:

the authentication information is a report file generated by the trusted certificate generator, and the report file comprises a second code hash and signature information of the trusted certificate generator; and performing authentication on the trusted certificate generator based on the authentication information comprises,
  sending the report file to a third-party authentication institution to obtain an authentication result file, wherein the authentication result file comprises additional signature information of the third-party authentication institution, and
  verifying the additional signature information, and in response to the additional signature information being verified successfully, determining that the authentication on the trusted certificate generator succeeds.

12. The non-transitory, computer-readable medium of claim 8, wherein the operations comprise, after setting the first root certificate as a trusted root certificate of the TLS client:
  performing a TLS handshake with the one or more authenticated computing units to establish a trusted TLS channel; and
  obtaining the computing service corresponding to the computing task from the one or more authenticated computing units through the trusted TLS channel.

13. The non-transitory, computer-readable medium of claim 12, wherein obtaining the computing service corresponding to the computing task from the one or more authenticated computing units comprises connecting to at least one computing unit of the one or more authenticated computing units based on a routing path determined by a routing server based on load balancing of the one or more authenticated computing units, thereby obtaining the computing service corresponding to the computing task from the at least one computing unit.

14. The non-transitory, computer-readable medium of claim 8, wherein the operations comprise:
  determining that a first authenticated computing unit of the one or more authenticated computing units has failed; and
  switching to a second authenticated computing unit of the one or more authenticated computing units.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    sending, by a user terminal, a certificate request to a trusted certificate generator, wherein the certificate request comprises a first code hash of a computing task;
    receiving, by the user terminal, a certificate report from the trusted certificate generator, wherein the certificate report comprises a first root certificate in a certificate chain generated for the first code hash, wherein the certificate chain comprises a first public key certificate corresponding to the first root certificate, wherein the first public key certificate and a matched first private key form a first certificate pair, and wherein the first certificate pair is pre-distributed to one or more authenticated computing units running the computing task;
    using the user terminal as a transport layer security (TLS) client;
    setting the first root certificate as a trusted root certificate of the TLS client to communicate with the one or more authenticated computing units that have the first certificate pair and that functions as a TLS server; and
    obtaining a computing service corresponding to the computing task from the one or more authenticated computing units.

16. The computer-implemented system of claim 15, wherein the operations comprise, before sending the certificate request to the trusted certificate generator:
  obtaining authentication information of the trusted certificate generator; and
  performing authentication on the trusted certificate generator based on the authentication information.

17. The computer-implemented system of claim 16, wherein:
  the authentication information is an authentication result file authenticated by a third-party authentication institution, and the authentication result file comprises signature information of the third-party authentication institution; and
  performing authentication on the trusted certificate generator based on the authentication information comprises verifying the signature information, and in response to the signature information being verified successfully, determining that the authentication on the trusted certificate generator succeeds.

18. The computer-implemented system of claim 16, wherein:
  the authentication information is a report file generated by the trusted certificate generator, and the report file comprises a second code hash and signature information of the trusted certificate generator; and
  performing authentication on the trusted certificate generator based on the authentication information comprises,
    sending the report file to a third-party authentication institution to obtain an authentication result file, wherein the authentication result file comprises additional signature information of the third-party authentication institution, and
    verifying the additional signature information, and in response to the additional signature information being verified successfully, determining that the authentication on the trusted certificate generator succeeds.

19. The computer-implemented system of claim 15, wherein the operations comprise, after setting the first root certificate as a trusted root certificate of the TLS client:
  performing a TLS handshake with the one or more authenticated computing units to establish a trusted TLS channel; and
  obtaining the computing service corresponding to the computing task from the one or more authenticated computing units through the trusted TLS channel.

20. The computer-implemented system of claim 19, wherein obtaining the computing service corresponding to the computing task from the one or more authenticated computing units comprises connecting to at least one computing unit of the one or more authenticated computing units based on a routing path determined by a routing server based on load balancing of the one or more authenticated computing units, thereby obtaining the computing service corresponding to the computing task from the at least one computing unit.

21. The computer-implemented system of claim 15, wherein the operations comprise:

determining that a first authenticated computing unit of the one or more authenticated computing units has failed; and switching to a second authenticated computing unit of the one or more authenticated computing units.

* * * * *